United States Patent [19]

Perregaux

[11] Patent Number: 4,595,259

[45] Date of Patent: Jun. 17, 1986

[54] TRANSIENT STATE LIQUID CRYSTAL IMAGE BAR FOR ELECTROPHOTOGRAPHIC PRINTERS

[75] Inventor: Alain E. Perregaux, Pittsford, N.Y.

[73] Assignee: Xerox Corporation, Stamford, Conn.

[21] Appl. No.: 572,023

[22] Filed: Jan. 19, 1984

[51] Int. Cl.[4] .................... G02F 1/133; G02F 1/137
[52] U.S. Cl. .................... 350/331 R; 350/341
[58] Field of Search .............. 350/331 R, 341, 347 E

[56] References Cited

U.S. PATENT DOCUMENTS

| | | | |
|---|---|---|---|
| 3,645,604 | 2/1972 | Ngo | 350/335 |
| 3,674,341 | 7/1972 | Hedman et al. | 350/345 |
| 3,694,053 | 9/1972 | Kahn . | |
| 3,697,150 | 10/1972 | Wysocki . | |
| 3,776,615 | 12/1973 | Tsukamoto et al. | 340/784 |
| 3,784,280 | 1/1974 | Bigelow . | |
| 3,785,721 | 1/1974 | Harsch . | |
| 3,787,110 | 1/1974 | Berreman et al. | 350/341 |
| 3,821,720 | 6/1974 | Greubel et al. | 340/173 |
| 3,837,730 | 9/1974 | Hatfield | 350/349 |
| 3,850,517 | 11/1974 | Stephany et al. | 340/803 X |
| 3,854,751 | 12/1974 | Haas et al. . | |
| 3,857,629 | 12/1974 | Freiser . | |
| 3,910,680 | 10/1975 | Kakeda | 350/332 |
| 4,009,934 | 3/1977 | Goodwin et al. . | |
| 4,097,128 | 6/1978 | Matsumoto et al. | 350/333 |
| 4,126,382 | 11/1978 | Barzilai et al. | 350/331 |
| 4,386,836 | 6/1983 | Aoki et al. | 355/3 R |

OTHER PUBLICATIONS

Sheng, "Introduction to the Plastic Continuum Theory of Liquid Crystals" Priestly et al., editor *Introduction to Liquid Crystals* Plenum Press New York, 1974, p. 103, 106.
Chabicousky et al., "A Matrix Liquid Crystal Color Display" Conference Record of the 1978, Biennia Display Research Conference, Cherry Hill, N.J. USA.
Lefkowitz et al., "Liquid Crystal Reflection Cell with Improved Response Times" Applied Optics vol. 19, No. 19, Oct. 1, 1980 pp. 3257-3259.
Kwon et al., Improved Liquid Crystal Response Time" Applied Optics vol. 18, No. 11, Jun. 1, 1979.
Demus, "Liquid Crystal Composition and Display Performance" *Non-Emmise Electro-Optic Displays* Plenum Press New York, 1926.
Article "Fast Switching Twisted Nematic Electro-Optical Shutter and Colour Filter" in the Electronics Letters, vol. 10, No. 7, 4/4/74, pp. 114 and 115.
Article "A LC/CRT Filed-Sequential Color Display" by R. Vatni et al.; Society for Information Display (SID) Digit of Technical Papers May 1983, pp. 28 and 29..
Article "A Liquid Crystal Optical Switching Devices (-Cell)" by P. J. Bos et al., Society for Information Display (SID), Digest of Technical Papers, May 1983, pp. 30 and 31.

*Primary Examiner*—John K. Corbin
*Assistant Examiner*—David Lewis
*Attorney, Agent, or Firm*—Robert A. Chittum

[57] ABSTRACT

A liquid crystal image bar for an electrophotographic printer is disclosed, having a nematic liquid crystal device with crossed polarizers configured as a single array of dot shutters that are driven by a single frequency voltage source. The image bar produces latent electrostatic image on the printer's photoconductive member one line at a time in response to receipt of digitized data signals. During the operational mode, all of the image bar shutters are energized and, in this electrically driven state, the image bar shutters are non-transmissive. The latent image is produced by selective erasure of precharged background areas on the member. For the erasure to occur, interruption of the driving voltage to selected shutters in response to the data signals cause the selected shutter to become transmissive because the liquid crystal material enters a transient state. The response time for the transmissiveness is about one millisecond. Consecutively erased spots by the same shutter requires the momentary reapplication of the driving voltage. Because the function of the image bar is relatively independent of temperature and gap thickness, it is very cost effective.

14 Claims, 8 Drawing Figures

TRANSIENT STATE LIQUID CRYSTAL IMAGE BAR FOR ELECTROPHOTOGRAPHIC PRINTERS

BACKGROUND OF THE INVENTION

1. Field of the Invention

The present invention relates to liquid crystal devices used in electrophotographic printers as light valves and, more particularly, to those transmissive, nematic types arranged as a single array of dot shutters which have response times fast enough to form latent electrostatic images on a moving photoconductive member one line at a time.

2. Description of the Prior Art

In a typical transmissive type, liquid crystal device, a thin layer of liquid crystal material is sandwiched between parallel, transparent glass substrates bearing transparent, patterned electrodes on their inner confronting surfaces. At least one polarizer is located on the outer surface of one of the glass substrates and a light source spaced from the device directs light therethrough. By selectively applying an electric field across the layer of liquid crystal material by means of selectively applying an a.c. voltage to the electrodes, the transmissivity of the liquid crystal device may be changed for passing or blocking light in accordance with the electrodes addressed by the voltage.

Liquid crystal materials are organic substances made up of rod-like molecules that are typically about 10 angstroms long and several angstroms thick. Within certain temperature ranges, these materials exhibit optical properties of an ordered crystal but have flow properties of liquid.

There are three general types of liquid crystal materials; viz., the smectic, the nematic, and the cholesteric. These are distinguished by differing types of translational or orientational ordering in their molecular arrangement. In the nematic-type, which is the type used in the present invention, the center of gravity of the molecules is unordered and random, as in the case of isotropic liquids, but the molecules tend to align themselves with their long axes parallel.

Since the individual liquid crystal molecules have a elongated shape and dipoles (both permanent and induced) which are direction dependent, films of these materials exhibit anisotropy in their dielectric constant and refractive index. Materials that exhibit a positive dielectric anisotropy have molecules that tend to align themselves parallel to an applied electric field, while the molecules of materials that exhibit a negative dielectric anisotropy tend to align themselves perpendicular to the field. Because of their optical anisotropy, a change in orientation of the liquid crystal molecules by an electric field can cause a change in optical transmission when used in conjunction with light polarizing sheets.

By suitable treatment of the inner glass substrates, nematic liquid crystal material which have a positive dielectric anisotropy are caused to align in a particular direction parallel to the glass substrate surfaces. In one method, the glass substrates may be coated with a thin organic film and conditioned by, for example, rubbing it with a lint-free cotton twill cloth in a unidirectional manner. Fine grooves about 50 angstroms wide are formed causing the liquid crystal molecules to lie substantially parallel to these furrows since this results in a lower energy state. Such a conditioned film is generally called the alignment layer or film. During fabrication the two glass plates are oriented with their alignment directions (in this invention) parallel to each other.

A typical transmissive, liquid crystal device that uses a nematic liquid crystal material with a positive dielectric anisotropy comprises two parallel, transparent glass substrates having one or more transparent electrodes on the inner surface of a one of the glass substrates with a plurality of transparent electrodes on the inner surface of the second glass substrate that are parallel to each other but perpendicular to the electrodes on the inner surface of the first glass substrate. A transparent alignment layer covers the electrodes so that the molecules of the liquid crystal material placed between the glass substrates are parallel to the glass substrate surface while they are on their stable relaxed state. When a voltage is applied to the electrodes, the molecules orient themselves perpendicular to the glass substrates and parallel to the direction of the electric field. A polarizer placed on the outside surface of one of the glass substrates, allows the light vector of one direction to pass therethrough but blocks all other light vectors.

When the liquid crystal molecules are lying parallel to the glass substrates in their relaxed state, due to their birefringence, they convert the linearly polarized light passed by one polarizer into elliptically polarized light. Once a voltage is applied to the electrodes, the molecules rotate by 90 degrees to align themselves parallel to the electric field and perpendicular to the glass substrates. This is the electrically driven stable state, and in this arrangement, it does not affect the state of polarization of light that travels in a direction essentially perpendicular to the glass substrates. If two polarizers are used on either side of the device, their transmission axes can be either parallel or crossed depending on whether it is desirable that the driven state be clear or dark respectively.

Liquid crystal devices generally change states from transmissive to non-transmissive and back again to its original state relatively slowly. Their response times are typically 100 milliseconds or longer and, at that rate, would require at least five minutes to print one page, if a typical liquid crystal device having a single array of dot shutters at a density of 10 per millimeter were used as an image bar to mark the photoconductive member of an electrophotographic printer.

Liquid crystal devices react slowly because they rely on the motion of long, heavy molecules in a viscous environment. Nearly all present devices currently used are based on the existence of two optically distinct states, one of which is an electrically driven state and the other is a relaxed or at rest state. The transition time from the relaxed state to the driven state can be made short provided that the applied voltage is high enough. However, the return to the relaxed state is a slow transition which is controlled only by the coupling forces that bond the molecules to the inner face of the device electrodes. The problem of the slow return from the driven state to the relaxed state is always present.

Since the electrically driven state may be achieved very fast, one solution to the problem of slow recovery to the relaxed state consists of driving the liquid crystal material from the driven state back to the relaxed state. This is the dual frequency approach requiring a liquid crystal material which orients its molecules in one direction when a first electric field of one frequency is applied and in another direction 90 degrees from the first when a second electric field of a second frequency is applied. Such liquid crystal materials are very temperature dependent and require means to keep their temperatures constant. In addition to this extra apparatus, the electronic circuitry of a dual frequency method can be complex and costly.

U.S. Pat. No. 3,854,751 to W. E. Haas and J. E. Adams discloses a device with interdigitated electrodes, in which two electric fields perpendicular to each other can be applied sequentially to turn the liquid crystal molecules parallel or perpendicular to the glass substrates. With this scheme the long relaxation times can be avoided, but for high resolution applications, as required of image bars for electrophotographic printers, the approach is too complex and costly to manufacture to be considered in all but the most expensive printers.

U.S. Pat. No. 4,386,836 to K. Aoki et al discloses a liquid crystal image bar which operates as a light valve. The liquid crystal material has an inverted dielectric anisotropy on opposite sides of a critical frequency and is selectively driven from one stable state to another by selectively applying two different frequency signals to the liquid crystal material.

U.S. Pat. No. 3,857,629 to M. J. Freiser and U.S. Pat. No. 4,009,934 to R. M. Goodwin et al also shows liquid crystal devices which use the dual frequency method to drive the liquid crystal material between stable states. An article entitled "Fast-Switching Twisted Nematic Electro-Optical Shutter and Colour Filter" by J. P. Sumner, *Electronics Letters*, Vol. 10, No. 7, 4/4/74, Pages 114 and 115, discloses yet another dual frequency method.

U.S. Pat. No. 3,697,150 to J. J. Wysocki discloses a twisted or cholesteric cell with a dipolar material added to the liquid crystal material to reduce the time during which the liquid crystal material reaches the stable relaxed state from the stable electrically driven state. Since this patent is concerned with moving from one stable state to another, the response time are too slow for use in electrophotographic printer image bars.

U.S. Pat. No. 3,694,053 to F. J. Kahn discloses a nematic liquid crysta device having an alignment layer and an electronically tunable optical birefringence which may switch colors by changing the voltage applied. This patent teaches moving from one stable state to another stable state so that its response times may not be suitable for use as an image bar, furthermore, the tolerances within which the devices must be made are very tight.

U.S. Pat. No. 3,821,720 to W. Greubel et al discloses a complex system for storing displayed information in a liquid crystal device using a cholesteric or twisted cell having a positive dielectric anisotropy. The device operates from one stable state to another and, therefore, has response time too slow for use in image bars.

U.S. Pat. No. 3,785,721 to T. B. Harsch discloses a nematic liquid crystal device which varies color by varing the applied voltage. This device is not concerned with response time and, of course, cannot be used as an image bar.

U.S. Pat. No. 3,784,280 to J. E. Bigelow discloses a reflective, light-dark nematic liquid crystal device in which the liquid crystal material has a positive dielectric anisotropy. Molecule alignment at the opposing transparent substrate surfaces are mutually parallel. High voltage orients the liquid crystal molecules in the electric field to a position perpendicular to the substrate surfaces, thus readily transmitting light and becoming the bright state. By utilizing a polarizer at a 45 degree angle with respect to the liquid crystal molecules in their relaxed state on one side of the liquid crystal device and a quarter wave plate and reflector on the other side, one polarizer may be eliminated to increase intensity of the bright state. This device operates from stable states and does not teach improvement in response time between states. Also, this device is a reflective one and is not applicable as an image bar which generally is a light transmissive device.

U.S. Pat. No. 4,097,128 to S. Matsumoto et al discloses a nematic liquid crystal cell in which the liquid crystal material contacting one of the cell substrate surfaces orients the material molecules parallel to the substrate surface, while the other substrate surface orients the material molecules perpendicular thereto. An applied electric field rotates the molecules of the liquid crystal material to change the birefringence of the liquid crystal material and thus the color of light displayed. Extreme gap dimensional control or tolerance is required to achieve a single color with various voltage levels applied to the electrodes of the device. Also, the device operates from one stable state to the other and rapid response times are not critical as is necessary for image bars.

U.S. Pat. No. 4,126,382 to G. Barzilai et al discloses a method for displaying images with liquid crystal devices. It is observed that from a certain value of the RMS applied voltage pulse, the intensity of the transmitted light is rapidly increased up to a peak value and then decreases with appearance of other luminosity peaks which may correspond to transient states. Since the human eye has a slow response time, it is fooled into seeing white light as the liquid crystal molecules remain in dynamic deformation conditions (transient state) between applied voltage pulses. This patent is directed to displays such as TV screens and does not address the problem of the fast response times necessary for image bars which digitally produce a linear array of light spots on a moving photoconductive member to produce a latent electrostatic image one line at a time. To the contrary, Barzilai wants relatively slow transition time since it is dealing with human perception.

An article entitled "A LC/CRT Field-Sequential Color Display" by R. Vatne et al, Society for Information Display (SID), *Digest of Technical Papers*, May 1983, Pages 28 and 29, describes a color system that uses a new type of liquid crystal color filter. This system uses a single frequency material in a liquid crystal device called a "$\pi$-Cell" for fast switching and excellent angular viewability.

An article entitled "A Liquid Crystal Optical Switching Devices ($\pi$-Cell)" by P. J. Bos et al, Society for Information Display (SID), *Digest of Technical Papers*, May 1983, Pages 30 and 31, describes a new approach to make a fast, liquid-crystal, optical-switching device having a large cone of view.

The two SID articles discuss a thin liquid crystal cell on the order of 3 to 5 $\mu$m in order to provide a large viewing angle, and a $\pi$-Cell configuration is used to minimize the response time.

SUMMARY OF THE INVENTION

It is an object of the present invention to provide an improved electrophotographic printer which utilizes a single frequency driven liquid crystal device in the form of a single linear array of dot shutters for use as an image bar to produce latent electrostatic images on a moving photoconductive member one line at a time.

It is another object of this invention to combine crossed polarizers with a single frequency driven liquid crystal device for use as an image bar which passes light only when the liquid crystal material is in the transient state, so that the response time of the liquid crystal material is increased to permit acceptable printing speeds without the need of a dual frequency driving method.

It is still another object of this invention to provide a liquid crystal image bar which has a minimum time from the non-transmissive to the transmissive state of 1.0 millisecond.

It is a further object of this invention to provide a liquid crystal image bar which is relatively independent of gap spacing and temperature.

In the present invention, the crossed polarizers are used on either side of a nematic liquid crystal device to prevent the passage of light in the electrically driven state. The liquid crystal device is configured as a single array of dot shutters and is driven by a single frequency voltage source. A nematic liquid crystal material having a positive dielectric anisotropy is used. During the operational mode of the liquid crystal device, all of the electrodes forming the dot shutters remain energized. The electrically driven stable state of the liquid crystal material would permit the transmission light except for the crossed polarizers. When selected ones of the dot shutters are to transmit light, the electric field across the electrodes forming the dot shutters is interrupted. Within one millisecond into the transient state of the liquid crystal material, about 90 percent of the transmissionable light is being passed through the selected dot shutters. The first transmission maximum occurs and deminishes to about 90 percent of the transmissionable light after two or three milliseconds, but this is sufficient time to form one line of a latent electrostatic image on a moving photoconductive member. Upon the expiration of two or three milliseconds and before the transient state of the liquid crystal material leaves its first transmission maximum as it goes through its succession of maximum and minimum transmission states, the electrodes are re-energized. If a second succeeding line of latent image requires the passage of light from the same dot shutter, the voltage to the electrodes is interrupted again to pass another beam of light. The energized period or cycle is so short relative to the movement of the photoconductive member that there is no undischarged space between adjacent spots or pixels and high quality latent images are produced. Such an arrangement provides a liquid crystal dot shutter type image bar suitable for use in an electrophotographic printer wherein the photoconductive member moves at a speed of 2 inches per second. This arrangement is relatively independent of temperature and gap thickness, so that it is very cost effective and suitable for low cost printers.

DESCRIPTION OF THE PREFERRED EMBODIMENT

Figure 1:
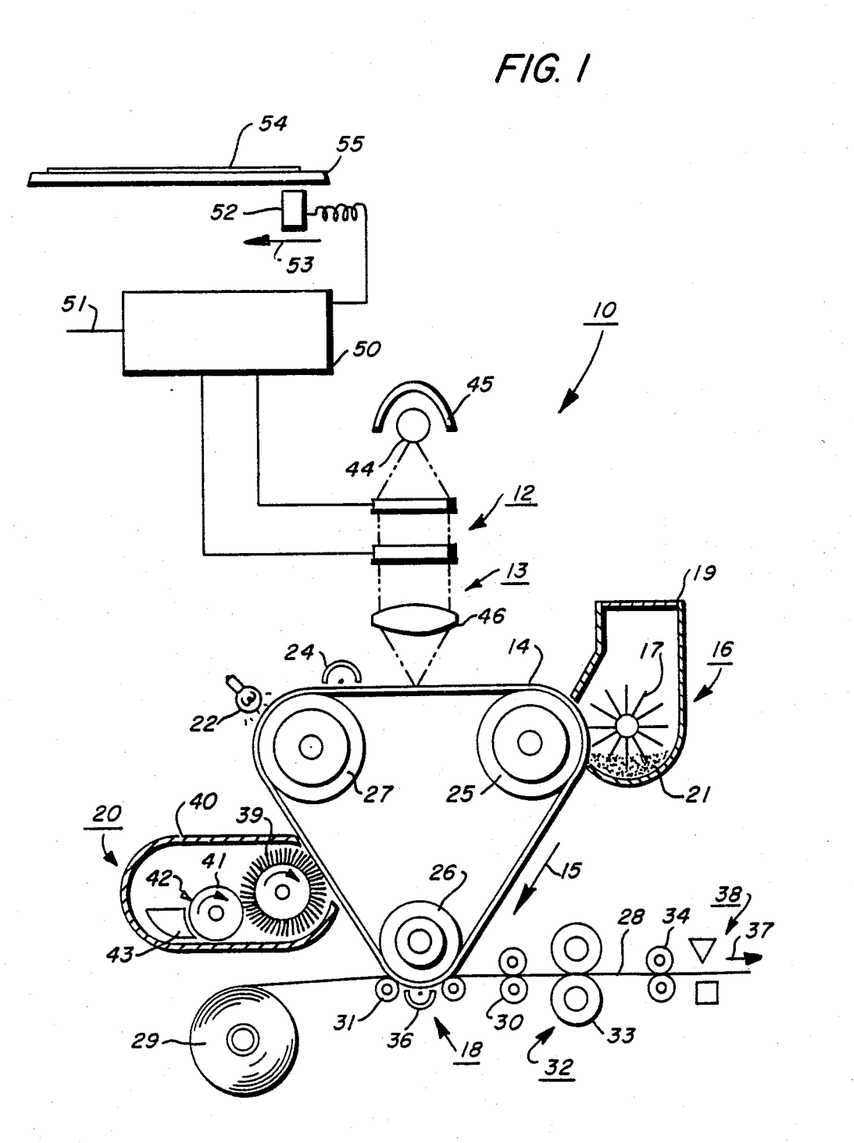
FIG. 1 is an elevation view of a system diagram of an electrophotographic printer incorporating the liquid crystal image bar of the present invention.

Referring to the system diagram of FIG. 1, there is shown an electrophotographic printer 10 arranged in accordance with the present invention utilizing a liquid crystal image bar 12. The printer 10 includes a series of process stations through which a photoconductive member 14 in the form of an endless belt passes. Although the preferred embodiment depicts an endless belt configuration for the photoconductive member, various other configurations (not shown) could be used such as, for example, a cylindrical drum.

Beginning with the imaging station 13, whereat the latent electrostatic image is formed, the photoconductive member 14 proceeds in the direction of arrow 15 around guide rollers 25, 26 and 27, past development station 16, transfer station 18, cleaning station 20, erase lamp 22 and precharging corona generating device 24 prior to returning to the imaging station. At least one guide roller is adjustable to maintain appropriate tension on the photoconductive member and to steer the photoconductive member 14 so that it does not gradually travel or "walk" off of the guide rollers. The adjustable roller, which in the preferred embodiment is roller 27, may be steered automatically by means well known in the belt tracking prior art.

At development station 16, a rotating magnet brush or paddle wheel 17, housed in hopper 19, presents toner particles 21 onto the surface of the photoconductive member 14 as it moves around guide roller 25. The toner particles 21 are charged with a polarity opposite the charges placed on the photoconductive member by the corona generating device 24 by means well known in the art by either triboelectric charging technique or by a corona generating device (not shown) or both. The toner particles are attracted and held by the latent electrostatic image recorded on the photoconductive member at the imaging station, thus developing and rendering the latent image visible. The developed image is transferred to a permanent material 28, such as paper, at the transfer station 18. After the developed image is transferred, the photoconductive member proceeds past the cleaning station 20 where all residual toner particles are removed.

The developed image is electrostatically transferred to the paper at the transfer station 18. The paper is provided by supply roll 29 which is pulled through the transfer station via drive rolls 30 and through a toner particle fusing station 32 by drive rolls 34, whereat the developed image on the paper is permanently fixed thereto by means well known in the prior art, such as, by fusing rolls 33 which apply heat and pressure to the developed image. A pair of idler rollers 31 are positioned to maintain the paper in intimate contact with the photoconductive member at guide roller 26, while transfer corona generating device 36 places an electric charge of opposite polarity to that of the charged toner particles to the back side of the paper. The magnitude of the charge from corona generating device 36 is greater than that of the latent electrostatic image to facilitate the transfer of the developed image to the paper. This electrostatic transfer technique is well established in the prior art along with many variations thereof.

Cutter assembly 38 cuts the paper 28 with the fixed images into separate sheets as the paper moves in the direction of arrow 37 and exits from the printer 10 into a collection tray or sorter (not shown).

Subsequent to the developed image transfer, the photoconductive member 14 is moved past the cleaning station 20, which removes any residual toner particles not transferred to the paper. A soft rotating brush 39, housed in chamber 40, removes the residual toner from the photoconductive member 14 and a single conductive, electrically biased roll 41 is used to remove the toner particles from the brush 39. A conventional flicker bar (not shown) is arranged to assist in toner particle removal from the soft brush and a doctor blade 42 is used on the biased roll 41 to scrape the toner particles therefrom into a collecting tray 43, so that the toner particles collected may be reused if that is desired.

The imaging station comprises a light source 44 and reflector 45 which illuminates a liquid crystal image bar 12, more fully discussed later. Light selectively passed through the image bar is focused by lens means 46 which may be one or more single lens, a selfoc lens system or a plurality of minature lens associated with fiber optics. The image bar selectively passes light to form latent electrostatic image one line at a time by erasing or discharging the image background areas. The image bar is formed by a single row of dot shutters actuated by selective application of a voltage to the plurality of electrodes on one of the substrates of the image bar. An electronic controller or microcomputer 50 energizes the appropriate electrodes in response to digitized data from a scanning means such as a charged coupled device (CCD) 52 or digitized data from a source outside the printer 10, for example, from a character generator, computer or other means for storing and retrieving data via conduit 51. If a scanning CCD is used, it scans one line of information at a time from a stationary document 54 placed on a transparent, fixed platen 55. The CCD scanning speed in the direction of arrow 53 is substantially the same as the speed of the photoconductive member if real time imaging is to occur. Otherwise, a means for storing the document digitized data would have to be included in the electronic controller.

Figure 2A:
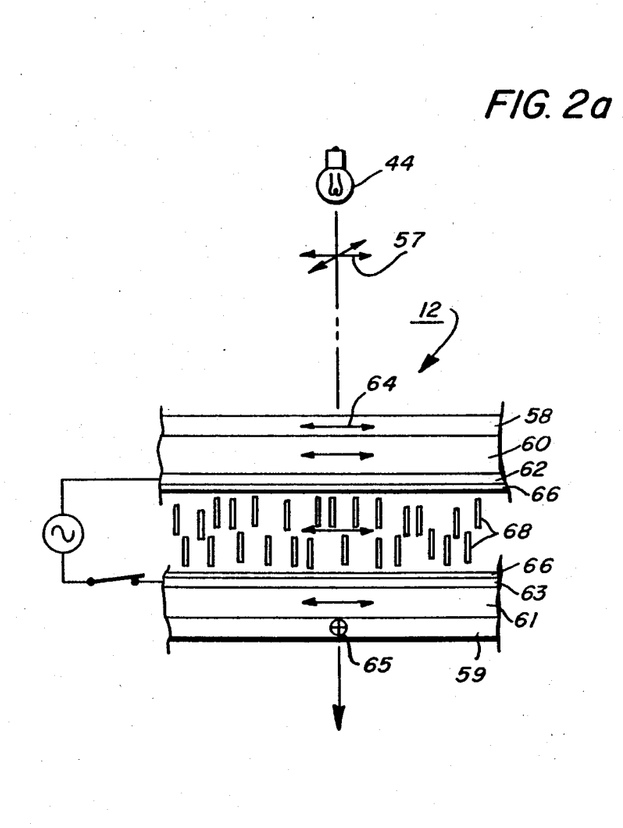
FIG. 2a is a cross-sectional elevation view of a schematic diagram of the liquid crystal image bar of FIG. 1, showing the orientation of the liquid crystal molecules in the stable "on" or energized state with light being blocked by the crossed polarizers.
Figure 2B:
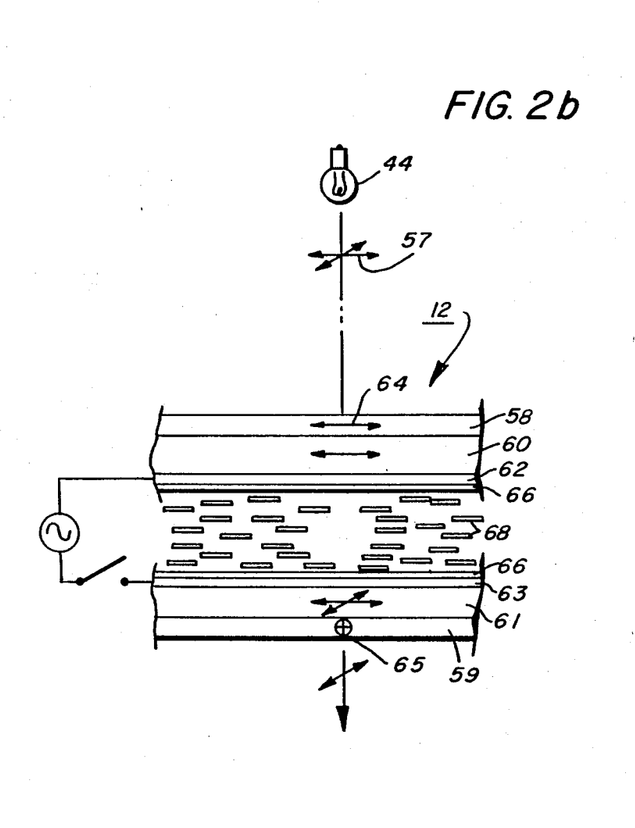
FIG. 2b is the same as FIG. 2a except the electrodes are not energized and shows the orientation of the molecules in their relaxed state with light being passed because the polarizers are positioned at a 45 degree angle with respect to the main axes of the liquid crystal molecules in their relaxed state.
Figure 3:
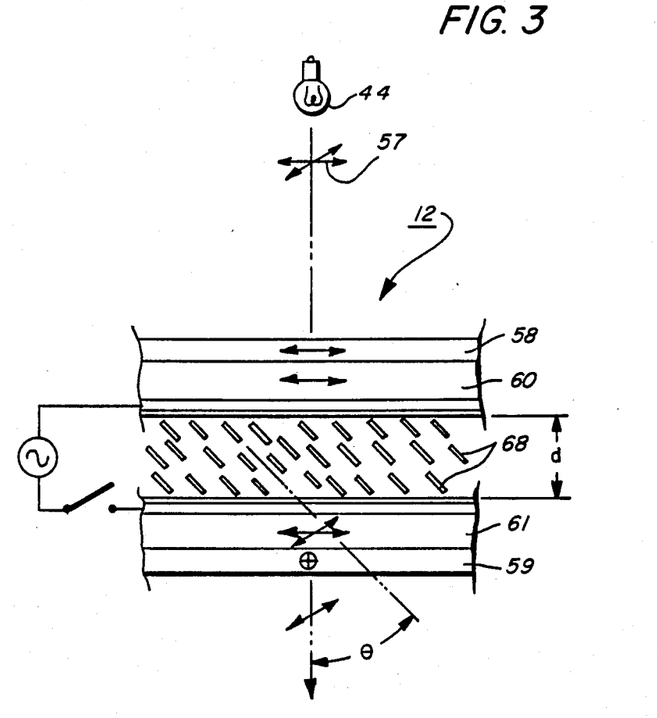
FIG. 3 is a cross-sectional elevation view of a schematic diagram of the liquid crystal image bar of FIG. 1, showing the orientation of the liquid crystal molecules in the transient or transmissive state.

The image bar of the present invention is shown in FIGS. 2a, 2b and 3, wherein a transmissive, nematic liquid crystal device 12 is depicted. Crossed polarizers 58, 59 such as, for example, Polaroid HN32 polarizers marketed by the Polaroid Corporation, are attached to each of the outside surfaces of the two parallel, transparent glass substrates 60, 61. Transparent electrodes 62, 63 are placed on the inner, confronting surfaces of the glass substrates. A light shield 49, shown in FIG. 4 and more fully described later, forms a slit 46 along the center portion of electrode 62 which runs the length of the liquid crystal device. A transparent alignment layer 66 covers the electrodes 62, 63 and the light shield. A thin layer of nematic liquid crystal material, such as Merck No. 1132 from the E. Merck Company of Darmstadt, W. Germany, is positioned between the glass substrate surfaces having the electrodes 62, 63. The liquid crystal material known as E7 or E44 manufactured by the British Drug House (BDH), Poole, England are also suitable materials for an image bar.

The polarizing axes of the two polarizers 58, 59 are positioned on the glass substrates 60, 61 so that they are mutually perpendicular to each other and so that that they are at a 45 degree angle with respect to the main axes of the liquid crystal molecules 68 when the molecules are in their relaxed state as shown in FIG. 2b. Light depicted as vectors 57 from source 44 enters the liquid crystal material through the polarizer 58 on glass substrate 60. However, only the light vector parallel to the transmission axis 64 of polarizer 58 enters the liquid crystal material and, because of the orientation of the polarizers with respect to the main axis of the liquid crystal molecules in their relaxed state, as shown in FIG. 2b, the amount of light that is transmitted by the second polarizer 59 is strongly wavelength dependent. In other words, due to birefringence of liquid crystal molecules, the light transmitted by the system in its non-energized state (FIG. 2b) is made of a complex color mixture. In the electrically driven state as shown in FIG. 2a, the polarized light is blocked by the second polarizer 59 on glass substrate 61, because the transmission axis 65 of polarizer 59 is perpendicular to that of polarizer 58 and because the state of polarization of the light is essentially left unmodified by the liquid crystal molecules regardless of wavelength.

As a consequence, all areas of the device that are not energizable will transmit a certain amount of stray light which may be damaging to the printing process. For this reason a light shield 49 blocking this stray light must be incorporated in the device. It can be, for example, an opaque metal or organic film deposited on the inner face of one of the substrates. In the preferred embodiment, light shield 49 is on glass substrate 60. The opaque film could have also been deposited on the outside of one of the glass substrates, provided the resulting parallax is not detrimental to the performance of the system.

When the printer 10 is placed in the operating mode, all of the electrodes are energized to maintain the liquid crystal molecules in their stable electrically driven state as shown in FIG. 2a. In the crossed polarizer configuration, the transient state is the bright state or transmissive state; refer to FIG. 3.

As is well known in electrophotography, any position of the photoconductive member which receives light becomes conductive and dissipates surface charges thereon. Accordingly, to form a latent electrostatic image, the background regions of the image must be exposed to light. Therefore, when a liquid crystal device is used as an image bar, it is the transmissive state which is used as an erasure state and, accordingly, it must be short and well controlled if latent images are to be produced on a moving photoconductive member by it one line at a time. As a general rule, if a succession of black and white lines are to be printed, the time allocated to the transmissive state or phase must be roughly ¼ of the time needed to print two lines. This rule is a consequence of the combination of two facts; namely, the transmissive phase is an erasure phase and the photoconductive member is constantly moving.

As a typical example, the time that can be allocated for the liquid crystal image bar to reach a transmissive or clear state is 1.0 millisecond. Thus, in the case of 250 lines per inch resolution, which is a reasonably good resolution in xerography, the photoconductive member speed of movement must be about two inches per second.

Figure 4:
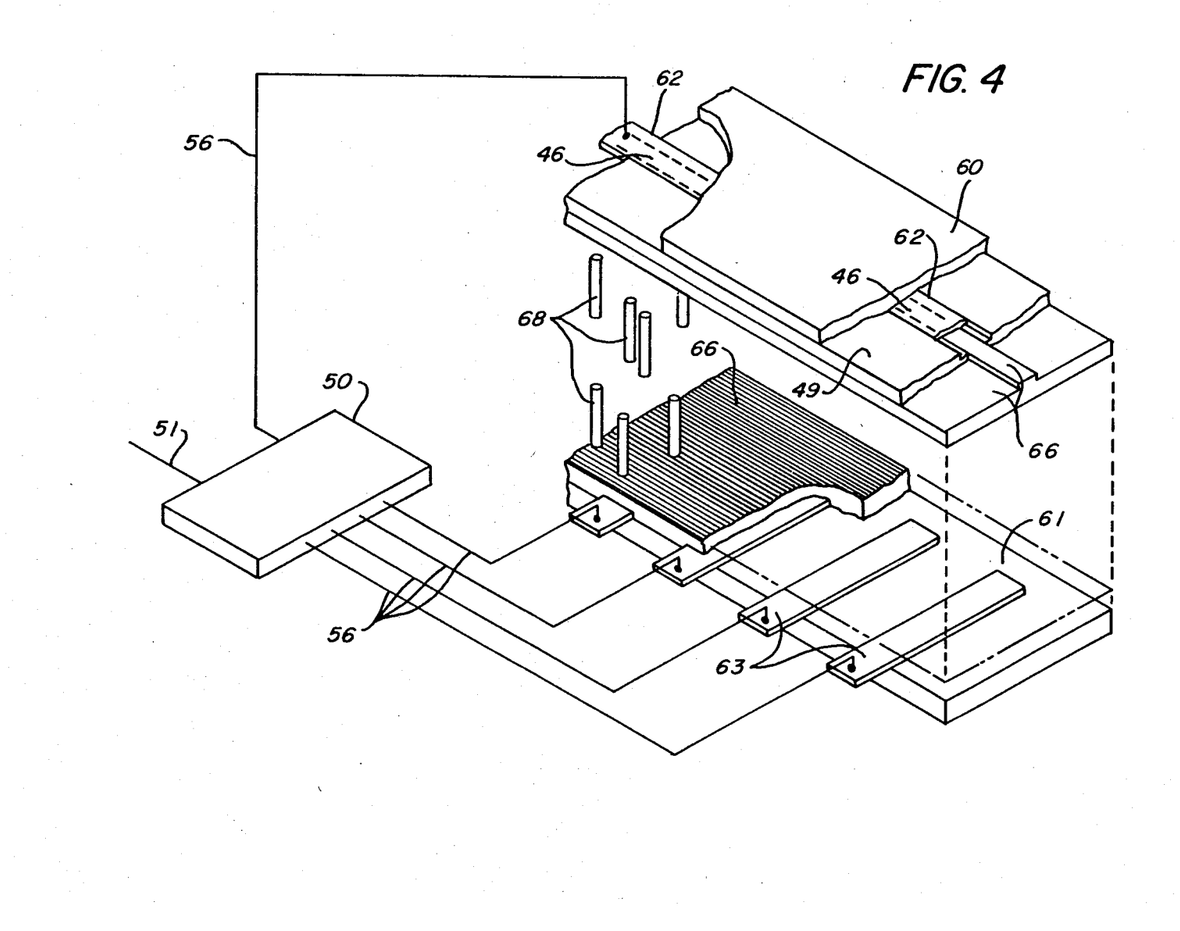
FIG. 4 is an enlarged, partially sectioned, perspective view of a schematic diagram of a portion of the liquid crystal image bar of FIG. 1 with the polarizers removed, showing the arrangement of electrodes on the transparent glass substrates which form a linear array of dot shutters and showing the light shield which forms a light passing slit along the center portion of the transparent electrode on one of the glass substrates.

FIG. 4 shows schematically the simple electrode configuration for the image bar used in the preferred embodiment. A single transparent electrode 62 runs length of the inner surface of the upper glass substrate 60. Light shield 49 covers the inner surface of glass substrate 60 and overlaps the edges of electrodes 62 so that a slight 46 is centrally formed along the length of the electrode 62. A plurality of transparent, parallel electrodes 63 are formed on the inner surface of the lower glass substrate 61. The plurality of electrodes 63 are equally spaced from each other and are perpendicular to the electrode 62. The density of the plurality of electrodes are about 10 per millimeter, thus forming one single array of dot shutters to be used as an image bar to produce latent electrostatic images on a photoconductive member. The electronic controller or microcomputer 50 is connected to the electrodes 62, 63 via leads 56; electrode 62 is connected to a fixed reference zero voltage by the controller 50. The plurality of electrodes 63 are generally connected to a 50 volt RMS square wave at 5 to 10 KHz until light from source 44 is to be transmitted, whereupon the applied voltage to the desired electrode 63 is interrupted.

FIG. 3 shows that the liquid crystal molecules 68 begin to relax from their electrically driven state, where they are perpendicular to the glass substrates 60, 61, towards their relaxed or rest state, where they are parallel to the glass substrates. During this process, the liquid crystal molecules in this transient state cause the liquid crystal device to go through a succession of maximum and minimum transmission states, as the effective birefringence of the medium ($\Delta n(\theta)$), as a function of molecule orientation ($\theta$), goes from zero to its maximum.

Figure 5:
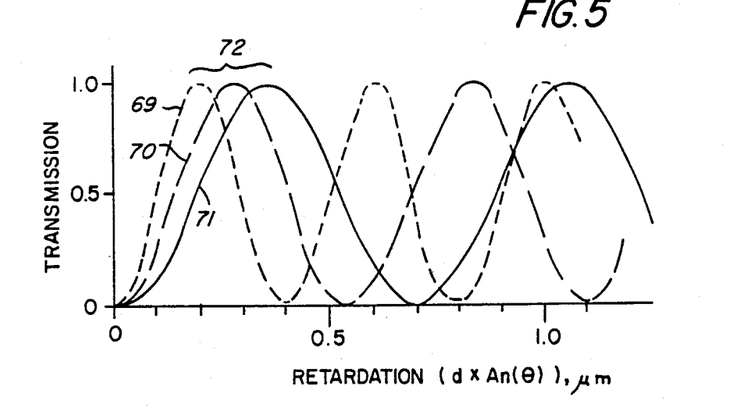
FIG. 5 is a graphical representation of the maximum and minimum transmission states the liquid crystal encounters during a transient state in which it moves from the stable energized state to the stable rest state.

In FIG. 5, the theoretical optical transmission of the image bar is plotted versus retardation which is a function of the product of gap or glass substrate spacing (d) and birefringence ($\Delta n(\theta)$), as $\theta$ goes from zero to $\pi/2$. The first maximum depicted at 72 is of greatest interest, since it is least wavelength dependent. Curve 69 is for light having a wavelength ($\lambda$) equal to 400 nm, curve 70 is for light having a wavelength ($\lambda$) equal to 550 nm, and curve 71 is for light having a wavelength ($\lambda$) equal to 700 nm. These light wavelengths represent blue, green, and red light, respectively. The first maximum 72 implies that light with a broader spectrum can be used without affecting the contrast excessively. This state could be held permanently if a low voltage square wave signal around 4 volts RMS were applied to the electrodes. If the applied voltage is switched from its high value to zero, the first maximum is reached within 1 millisecond, but lasts from 2 to 3 milliseconds before the first maximum 72 is passed and as the transmitted light moves towards its first minimum. This is better shown in FIGS. 6a and 6b as will be explained below.

Figure 6A:
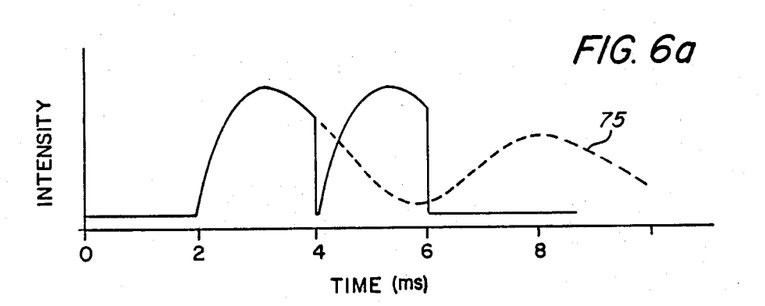
FIG. 6a is a graphical plot of the light intensity (I) passing through a one of the dot shutters of the image bar as a function of time when the driving voltage to the image bar electrodes is interrupted and reapplied.
Figure 6B:
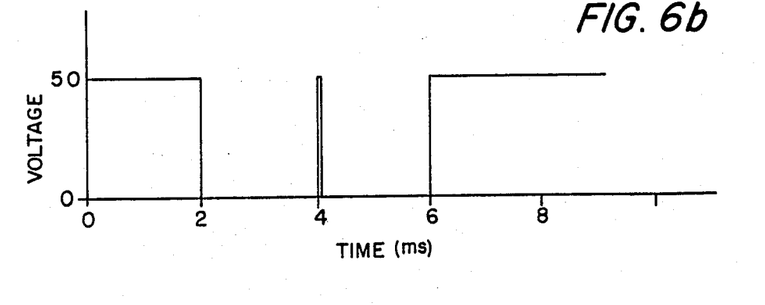
FIG. 6b is a graphical plot of the voltage applied to one of the dot shutters of the image bar showing the driving voltage as a function of time when the applied voltage is interrupted and reapplied.

FIG. 6b is a plot of voltage with respect to time in milliseconds across a representative electrode 63 and the single electrode 62. The a.c. voltage applied is a 50 volt RMS square wave and is interrupted or dropped to zero at the 2 milliseconds point from a reference time of zero. FIG. 6a shows the intensity of light passing through the image bar having the same time frame as that of FIG. 6b. When the voltage is applied, the stable electrically driven state of the liquid crystal molecules does not perturb the polarized light and the crossed polarizer blocks the light from the photoconductive member. As soon as the electric field across the electrodes is dropped to zero the liquid crystal molecules begin to rotate towards their relaxed stable state. Within one millisecond the intensity of the light exiting from the image bar and impinging on the photoconductive member has reached at least 90 percent of its maximum intensity. Within two or three milliseconds, the intensity of the light drops to below 90 percent of its maximum value as the light moves towards its first minimum transmission state. At this point the full 50 volt RMS square wave voltage is reapplied for a short time, for example, between 0.1 and 1.0 millisecond. This momentarily drives the liquid crystal molecules back to the stable electrically driven state prior to the interruption of the voltage. Again, the liquid crystal molecules begin to relax and within one millisecond the light intensity passed by the image bar is around 90% of its maximum intensity. The drop in intensity is for such a short time that the moving photoconductive member 14 causes the two bursts of light to merge or smear, thus, the effects on the photoconductive member is the erasure of two consecutive spots or pixels.

Without the pulsed interruption the intensity of the light would follow the curve 75 shown in dashed line in FIG. 6a so that the second pixel would not be erased.

It is important to note that the same image bar could be used in the reverse mode; i.e. with a transient dark and a permanent bright state provided the polarizing axes of the polarizers are parallel rather than crossed and still held at 45 degrees to the main axis of the liquid crystal molecules. In this arrangement the voltage is applied continuously until the dark state is required, which is exactly opposite to that of the preferred embodiment.

By systematically studying the response time as a function of liquid crystal material parameters, gap thickness and wavelength of light, it was discovered empirically that the response time is roughly proportional to $\eta/\Delta n$, where $\eta$ is the viscosity and $\Delta n$ the birefringence of the material. For homogeneously aligned Deformation of Aligned Phases (DAP) devices, of which the present invention is an embodiment, the decay time to the fully relaxed state is given by the expression:

$$\tau_{DAP} = \frac{\eta d^2}{K_{11} \pi^2} \qquad \text{(equation 1)}$$

where $\eta$ and $K_{11}$ are the viscosity and the splay elastic constant of the liquid crystal material; d is the thickness of the gap. However, in the case of the transient state, the end state is not the fully relaxed state, but instead, the state for which the birefringence induced retardation is $\lambda/2$.

Therefore, the relevant gap thickness is not d, but instead, d divided by the relative retardation R:

$$R = \frac{\Delta n d}{\lambda/2} \quad \text{(equation 2)}$$

The decay time, $\tau d$ for the transient state is then:

$$\tau d = \frac{\eta \lambda^2}{K_{11} 4\pi^2 \Delta n^2} \quad \text{(equation 3)}$$

If the numerical values of the parameters are inserted, assuming that the wavelength is $\lambda = 500$ nm, then for liquid crystal material known as E7 the $\tau d = 0.5$ ms and for the liquid crystal material known as 1132 the $\tau d = 1.0$ ms. These values are fairly accurately the decay timer determined experimentally by drawing the tangent to the response curve at the instant the voltage is turned off.

With this new relationship for $\tau d$, the decay time can be minimized even further with any material that minimizes the value of $\eta/K_{11}\Delta n^2$.

As observed experimentally before, $\tau d$ of equation 3 is independent of gap d. Only in cases where the product of $\Delta n$ times d is smaller than about 2 $\mu$m does the decay time depend on d, and actually increases as d decreases. The system of the preferred embodiment behaves as described by equation 3 as long as the gap is large enough to make the contribution of the boundaries negligible with respect to the behavior of the bulk of the liquid crystal material. Furthermore, $\tau d$ is nearly independent of temperature. Note that as temperature increases both $\eta$ and $\Delta n$ decrease. As a result, the transient DAP state of the present invention inventive image bar is practically independent of gap spacing and temperature.

Unlike dual frequency operated liquid crystal devices of the prior art, the liquid crystal image bar of the present invention is not temperature sensitive in the operating environment of an electrophotographic printer. Gap dimensional tolerances are another important factor in determining manufacturing cost and product yield which further impacts cost. The present invention, because it is relatively gap independent, may have a tolerance of up to $\pm 2$ or 3 $\mu$m for a gap of 12 $\mu$m. Additionally, viewing angle is of no consequence because use as an image bar requires only that the photoconductive member view the light transmitted by the image bar from one position, namely, within a small cone angle around 90 degrees of the image bar surface. Without being concerned with a wide viewing cone, the standard 10 $\mu$m thick device is perfectly acceptable.

Even though the main objective of this invention is to develop a liquid crystal image bar to be used in forming latent electrostatic images on the photoconductive member of an electrophotographic printer, it is also used to discharge the photoconductive member in areas outside of the image areas, such as side margins and the spaces between consecutive images. In addition to preventing the development of such areas in order not to produce dark margins on the final copy, it reduces the consumption of toner during the copy process.

In recapitulation, the present invention is directed to a liquid crystal image bar for an electrophotographic printer having a nematic liquid crystal device arranged as a single array of dot shutters that are driven by a single frequency voltage source. Crossed polarizers are oriented at approximately 45 degrees with respect to the main axes of the liquid crystal material while in their relaxed state; i.e., while they are parallel to the glass substrates that hold the liquid crystal material. The image bar produces latent electrostatic images on the printer's moving photoconductive member one line at a time in response to digitized data signals. During the operational or printing mode of the printer, all of the image bar shutters are energized and, in this electrically driven state, the image bar shutters are non-transmissive. The latent image is produced by selective erasure of the precharged photoconductive member in the background areas of the latent image. Each dot shutter is assigned a small area or pixel of the photoconductive member. For the erasure of each pixel to occur, interruption of the driving voltage to the electrodes making up the selected shutters cause the shutter to become transmissive as soon as the liquid crystal material enters a transient state. The response time for the transmissiveness is about one millisecond and lasts for about two or three milliseconds before the driving voltage must be reapplied. This is ample time for the erasure of one pixel. Consecutively erased spots by the same shutter requires the momentary reapplication and interruption of the driving voltage for each succeeding pixel to be erasured. This momentary reapplication and interruption of the driving voltage between the consecutive pixel erasures forms a substantially square pulse having a duration between 0.1 and 1.0 millisecond. This momentarily drives the liquid crystal molecules back to the stable electrically driven state prior to the fast interruption of the voltage. Upon interruption of the voltage again, the liquid crystal molecules begin to relax again and, within one millisecond, the light intensity passed by the selected shutter is back to around 90 percent of its maximum intensity. The non-transmissive period between bursts of light is for such a short period of time that the moving photoconductive member causes the consecutive bursts of light to merge or smear on the surface thereof. Therefore, instead of individual pixels of charges being erased, continuous lines of charges are erased in the direction of movement by the photoconductive member.

Such an arrangement provides a liquid crystal dot shutter type image bar suitable for use in an electrophotographic printer having a photoconductive member which moves relative to the image bar at speeds of up to two inches per second. Because the function of the image bar is relatively independent of temperature and gap thickness, it is very cost effective and suitble for low cost printers.

Many modifications and variations are apparent from the foregoing description of the invention and all such modifications and variations are intended to be within the scope of the present invention.

I claim:

1. An improved liquid crystal image bar for an electrophotographic printer of the type having a moving photoconductive member, means for pre-charging the photoconductive member prior to the formation of latent electrostatic images, means for developing the latent images with toner particles, means for transferring the developed images to permanent record sheets, means for fusing the developed images to the record sheets and means for cleaning the photoconductive member before it is pre-charged, the image bar containing a single array of dot shutters which selectively pass light in response to digitized data signals, during the operating mode of the printer, in order to discharge selectively the pre-charged photoconductive member and thus form the latent images on the photoconductive member one line at a time, the improved liquid crystal image bar comprising:

- a nematic liquid crystal material having a positive dielectric anisotropy and having parameters which enable a decay time ($\tau d$) on the order of one millisecond or less for the image bar to reach a first maximum transmission condition during its transient state;
- first and second parallel, elongated transparent substrates for holding the liquid crystal material therebetween, each substrate having inner and outer surfaces, the inner surfaces confronting each other and being spaced a predetermined distance from each other with the liquid crystal material sandwiched between said inner surfaces;
- at least one transparent electrode being located on the inner surface of the first substrate and a predetermined, equally spaced plurality of transparent mutually parallel electrodes being located on the inner surface of the second substrate, the electrodes on the second substrate being approximately perpendicular to the electrode on the first substrate, the electrodes and the liquid crystal material forming the single array of dot shutters;
- a transparent film being coated over the inner surfaces of the substrates and electrodes thereon, the film surfaces opposite the ones contacting the electrodes confront each other and contact the liquid crystal material, the confronting film surfaces that contact the liquid crystal material having parallel micro-grooves prepared therein to cause the molecules of the liquid crystal material to lie substantially parallel to the grooves, the substrates, and one another, without bend or twist, while in the stable de-energized or rest state;
- polarizers being positioned on each of the outer surfaces of the substrates parallel to each other, the polarizers being crossed with respect to each other and oriented at about 45 degrees with respect to the main axes of the liquid crystal molecules in their rest state;
- an illuminating means for directing light towards a one of the polarizers from a location spaced therefrom;
- an alternating current voltage source;
- means for energizing the plurality of electrodes on the second substrate with a voltage from the voltage source, the energization of the plurality of electrodes producing an electric field between said plurality of electrodes and said one electrode on the first substrate, which is generally grounded, in order to place the liquid crystal molecules in an energized or electrically driven state, whereby the polarized light entering the liquid crystal material through one polarizer is transmitted through the liquid crystal material unperturbed and the other crossed polarizer blocks the polarized light, so that image bar prevents the light from impinging on the photoconductor member when the liquid crystal molecules are in the electrically driven state; and
- means for de-energizing selected ones of the plurality of electrodes on said second substrate for a predetermined time period that is substantially equal to the decay time ($\tau d$) of the liquid crystal material followed by immediate energization thereof in response to receipt of digitized data signals, de-energization of each selected electrode for the predetermined time period followed by energization thereof being a cycle which places the liquid crystal material in the transient state for a sufficient time period to enable the image bar to reach substantially the first maximum transmission condition and cause a momentary passage of light through the image bar in the area covered by said cycled electrode, the momentarily passed light being a burst of light which impinges on the moving photoconductive member to discharge a precharged region on the photoconductive member representing a pixel thereon, thus, forming a latent electrostatic image one line at a time by the discharge of pixels representing the background regions of the latent image.

2. The improved liquid crystal image bar of claim 1, wherein a light shield is incorporated in the image bar to prevent stray light from reaching the photoconductive member.

3. The improved liquid crystal image bar of claim 2, wherein the light shield is an opaque film deposited on the inner surface of a one of the glass substrates.

4. The improved liquid crystal image bar of claim 3, wherein the opaque film is deposited on the inner surface of the first glass substrate and over the edges of the electrode thereon, so that an elongated, light-passing slit is formed along the length of the first glass substrate electrode.

5. The improved liquid crystal image bar of claim 1, wherein the density of the transparent electrodes on the inner surface of the second glass substrate is 10 per millimeter and the imaging length of the image bar is at least eight and one-half inches or about 216 millimeters.

6. The improved liquid crystal image bar of claim 1, wherein the voltage from the voltage source is on the order of a 50 volt RMS square wave at 5 to 10 $KH_z$; wherein spacing between substrates is 12±3 micrometers; and the liquid crystal material may be E7 or E44 from BDH or Merck No. 1132.

7. The improved liquid crystal image bar of claim 6, wherein the decay time, $\tau d$, for the transient state of the liquid crystal material is defined by the equation:

$$\tau_d = \frac{\eta \lambda^2}{K_{11} 4\pi^2 \Delta n^2} \leq 1.0 \text{ millisecond}$$

where:

$\eta$ = viscosity
$K_{11}$ = splay elastic constant of the liquid crystal
$\Delta n$ = birefringence of the liquid crystal
$\lambda$ = wavelength of light.

8. The improved liquid crystal image bar of claim 6, wherein the means of energizing and de-energizing the electrodes is an electronic controller which maintains the electrode on the first glass substrate at a fixed zero reference voltage and continually applies the 50 volt RMS square wave source to the plurality of electrodes on the second glass substrate during the operating mode of the printer, the controller interrupts the 50 volt RMS square wave voltage to selected electrodes on the second glass substrate when an associated pixel of the latent image background is to be erased in accordance with the digitized data signals and reapplies the square wave voltage to terminate the burst of light directed to the photoconductive member when the light intensity emitted from the image bar drops to about 90 percent of the first intensity maximum produced by the dampened, undulating transmission of light through the liquid crystal material, as the liquid crystal molecules relax with time toward their stable relaxed state.

9. The improved liquid crystal image bar of claim 8, wherein consecutive pixels are erased by interrupting and reapplying the 50 volt RMS square wave voltage to the electrodes on the second glass substrate within 0.1 and 1.0 millisecond to transmit a second and other succeeding consecutive bursts of lights, so that the consecutive bursts of light impinging on the surface of the moving photoconductive member are merged because of the short non-transmission period between bursts of light and the movement of said photoconductive member.

10. The improved liquid crystal image bar of claim 9, wherein the image bar erases edge margins of the latent image and spaces on the photoconductive member between latent images to reduce the consumption of toner particles and to provide margins around the developed images which are free of toner particles.

11. A method of producing a latent electrostatic image on a precharged, moving photoconductive member of an electrophotographic printer with a transmissive liquid crystal image bar of the type having parallel, elongated, transparent substrates for housing a liquid crystal material therebetween and having transparent electrodes arranged on the inner surfaces of the glass substrates to form a single linear array of dot shutters that are driven by a single frequency, alternating current voltage, comprising the steps of:

(a) filling the space between the substrates with a nematic liquid crystal material having a positive dielectric anisotropy, the molecules of which, in their relaxed state, lie substantially parallel to the substrates, without bend or twist, the liquid crystal material having molecules which enters a transient state when they have been subjected to an electric field and the electric field is interrupted, so that the image bar goes through a succession of maximum and minimum transmission conditions, the liquid crystal material having parameters which enable the image bar to reach a first maximum transmission condition within one millisecond or less;

(b) placing polarizers on each side of the image bar with their polarizing axes being mutually perpendicular and at an angle of about 45 degrees with the main axes of liquid crystal molecules when they are in their relaxed state;

(c) applying an alternating current (AC) voltage to the electrodes subjecting the liquid crystal molecules to an electric field and placing them in an electrically driven state thus causing the image bar to be non-transmissive;

(d) interrupting the applied voltage to the electrodes of the selected dot shutter in response to digitized data signals, so that the liquid crystal molecules under the influence of the selected dot shutter electrodes enter the transient state and cause the selected dot shutter to become momentarily transmissive and direct a burst of light toward the moving photoconductive member to erase precharged background areas and form latent electrostatic images thereon;

(e) reapplying the AC voltage to the electrodes of the selected dot shutter to make it non-transmissive as soon as the intensity of the light being transmitted by the dot shutter reaches a predetermined percent of its maximum intensity during the first maximum transmission condition of the image bar as the liquid crystal material molecules relax with time towards their relaxed state; and (f) repeating step (d) within typically less than 1.0 millisecond and then repeating step (e), when consecutive precharged background areas are to be erased by the same dot shutter, so that the relatively short time of non-transmission by the dot shutter produces consecutive bursts of light which impinge and merge together on the moving photoconductive member, thereby causing continuous linear areas of the precharged photoconductive member to be erased in the direction of movement of the photoconductive member.

12. The method of claim 11, wherein the method further comprises the steps of:

(g) forming a light shield on a one of the substrates to block stray light from transmissive areas of the image bar; and (h) using a liquid crystal material having a decay time, $\tau d$, for the transient state equal to or less than one millisecond where $\tau d$ is defined as:

$$\tau_d = \frac{\eta \lambda^2}{K_{11} 4\pi^2 \Delta n^2}$$

and where:
$\eta$ is the viscosity
$K_{11}$ is to splay elastic constant of the liquid crystal
$\lambda$ is the wavelength of the transmitted light
$\Delta n$ is the birefringence of the liquid crystal,
so that about 90 percent of the maximum light intensity transmitted by the image bar is reached within one millisecond.

13. An improved liquid crystal image bar for an electrophotographic printer having a moving pre-charged photoconductive member, the image bar containing a single array of dot shutters which selectively pass bursts of light in response to digitized data signals to discharge selectively pre-charged regions on the photoconductive member that represent picture elements or pixels and thus form the latent images thereon one line at a time, the improved liquid crystal image bar comprising:

a nematic liquid crystal material having a positive dielectric anisotropy and being capable of exhibiting a transient state that is initiated by the removal of an electric field across the liquid crystal material, from the onset of the transient state, the liquid crystal molecules cause the image bar to go through successive maximum and minimum transmission states, the liquid crystal material having parameters such that a decay time for the image bar to reach the first transient maximum transmission state is on the order of one millisecond or less;

first and second parallel, elongated transparent substrates for holding the liquid crystal material therebetween, each substrate having inner and outer surfaces, the inner surfaces confronting each other and being spaced a predetermined distance from each other with the liquid crystal material sandwiched between said inner surfaces;

at least one transparent electrode being located on the inner surface of the first substrate and a predetermined, equally spaced plurality of transparent mutually parallel electrodes being located on the inner surface of the second substrate, the electrodes on the second substrate being approximately perpendicular to the electrode on the first substrate, the electrodes and the liquid crystal material forming the single array of dot shutters;

a transparent film being coated over the inner surfaces of the substrates and the electrodes, the film surfaces opposite the ones contacting the electrodes confront each other and contact the liquid crystal material, the confronting film surfaces that contact the liquid crystal material having parallel micro-grooves prepared therein to cause the molecules of the liquid crystal material to lie substantially parallel to the grooves, the glass substrates, and one another, without bend or twist, while in the stable de-energized or rest state;

polarizers being positioned on each of the outer surfaces of the substrates parallel to each other, the polarizers being crossed with respect to each other and oriented at about 45 degrees with respect to the main axes of the liquid crystal molecules in their rest state;

an illuminating means for directing light towards a one of the polarizers from a location spaced therefrom;

an alternating current voltage source;

circuit means for energizing the plurality of electrodes on the second substrate with a voltage from the voltage source to produce an electric field between said plurality of electrodes and said one electrode on the first substrate, which is generally grounded, in order to prevent the passage of light through the image bar because of the crossed-polarizers; and means for selectively de-energizing each of the plurality of electrodes on said second glass substrate for a predetermined time period in response to receipt of the digitized data signals, each de-energized electrode being immediately energized by said circuit means upon expiration of said predetermined de-energizing time period, the de-energizaion of each selected electrode followed by energization thereof being a cycle that momentarily removes the electric field across that portion of the liquid crystal material in the selected electrode, the cycle resulting in a short transient state for the molecules of the liquid crystal material affected by said cycle in which the liquid crystal molecules cause the image bar to reach substantially the first maximum transmission condition, said predetermined de-energization time period being within a range beginning at the onset of the transient state and ending at the time when a predetermined percent of the maximum light intensity is transmitted by the image bar during the first maximum transmission condition, so that a momentary burst of light is passed through the image bar in the area covered by said cycled electrode and is directed to the photoconductive member, discharging a region representing pixel thereon.

14. A liquid crystal image bar for an electrophotographic printer of the type having a moving photoconductive member and pre-charging means therefor, the image bar forming electrostatic latent images on the photoconductive member one line of picture elements or pixels at a time in response to digitized data signals representing a document to be produced by selectively passing short bursts of light to discharge and therefore erase pixels of pre-charged areas on the photoconductive member, the image bar comprising:

first and second parallel, elongated transparent substrates having inner and outer surfaces and containing a quantity of nematic liquid crystal material between confronting inner surfaces thereof;

at least one transparent electrode on the confronting surface of the first substrate and a plurality of transparent, mutually parallel electrodes on the confronting surface of the second substrate, the plurality of electrodes on the second substrate being approximately perpendicular to the electrode on the first substrate;

the liquid crystal material having a positive dielectric anisotropy, the liquid crystal material having molecules which enter a transient state when they have been subjected to an electric field and the electric field is interrupted, while the liquid crystal material is in the transient state, the image bar goes through successive maximum and minimum transmission conditions, said liquid crystal material having parameters which enable the first maximum transmission condition, beginning from the onset of the transient state, to be reached in about one millisecond or less, without having bend or twist in the relaxed state crossed polarizers being positioned parallel to each other on opposite outer surfaces of the first and second substrates, the polarizers being oriented at about 45 degrees of the main axes of the liquid crystal molecules in their rest state;

light means for directing light towards one of the polarizers from a location spaced therefrom;

means for individually applying an alternating current voltage to each of the plurality of electrodes on the second substrate, while applying on the electrode on the first substrate a zero voltage thus subjecting the liquid crystal material to an electric field, so that polarized light passes through the liquid crystal material but is blocked by the crossed polarizer on the side of the image bar opposite the one confronting the light means; and means for selectively interrupting the electric field across the liquid crystal material in the area covered by the selected plurality of electrodes on the second substrate for about one millisecond to cause the onset of the transient condition of the liquid crystal molecules, across which the electric field has been interrupted, so that a short burst of light is passed by the image bar, the molecules of the liquid crystal material in the transient state change the state of polarization of the entering light enabling a burst of light to pass through the crossed polarizer and impinge on the photoconductor because the liquid crystal molecules, during this short period of electric field interruption, enable the image bar to reach substantially its first maximum transmission condition prior to reapplication of the alternating current voltage whereby light is blocked.

* * * * *